(12) United States Patent
Seidler et al.

(10) Patent No.: US 8,348,186 B2
(45) Date of Patent: Jan. 8, 2013

(54) FOOD MIXERS AND PROCESSORS

(75) Inventors: Mark Seidler, Chichester (GB); Keith Leaman, Havant (GB)

(73) Assignee: Kenwood Limited, Hampshire (GB)

( * ) Notice: Subject to any disclaimer, the term of this patent is extended or adjusted under 35 U.S.C. 154(b) by 270 days.

(21) Appl. No.: 12/867,553

(22) PCT Filed: Feb. 6, 2009

(86) PCT No.: PCT/GB2009/000320
§ 371 (c)(1),
(2), (4) Date: Oct. 4, 2010

(87) PCT Pub. No.: WO2009/103945
PCT Pub. Date: Aug. 27, 2009

(65) Prior Publication Data
US 2011/0186668 A1    Aug. 4, 2011

(30) Foreign Application Priority Data

Feb. 23, 2008  (GB) .................................. 0803325.0

(51) Int. Cl.
*B02C 25/00* (2006.01)
(52) U.S. Cl. .......... 241/36; 241/65; 241/101.3; 366/145
(58) Field of Classification Search ............. 241/199.12, 241/33, 36, 65, 101.3, 282.1, 282.2; 366/144–149
See application file for complete search history.

(56) References Cited

U.S. PATENT DOCUMENTS
5,829,341 A    11/1998 Lin
2002/0027175 A1    3/2002 Capp

FOREIGN PATENT DOCUMENTS
DE    4414825 A1    11/1995
DE    19624648 A1    1/1998
EP    1731068 A1    12/2006
GB    2441508 A    3/2008
(Continued)

OTHER PUBLICATIONS

British Search Report for GB0803325.0 filed Feb. 23, 2008, date of search Jun. 20, 2008.

(Continued)

*Primary Examiner* — Mark Rosenbaum
(74) *Attorney, Agent, or Firm* — Marty Fleit; Paul Bianco; Fleit Gibbons Gutman Bongini Bianco PL

(57) ABSTRACT

The invention provides an electrically-driven kitchen machine including a food mixer or a food processor. The machine has a support platform for supporting a receptacle for foodstuffs to be mixed or otherwise processed. The machine has an electric motor used to drive mixing or processing tools disposed in the receptacle; and a heater for heating the foodstuffs in the receptacle. In order to ensure that the temperature of the foodstuffs is accurately determined, the base of the receptacle consists of multiple layers, including a first metallic material, such as aluminum, having a relatively high thermal conductivity, sandwiched between outer and inner skins of a second metallic material of lower thermal conductivity than the first metallic material. The machine is also provided with first and second probes, each protruding through the receptacle-supporting platform and urged upwardly to contact the inner skin and the first metallic material respectively. The second metallic material typically comprises stainless steel, and the heater typically comprises an induction heater, in which case the probes are constructed so as to resist absorption of heat from the energy field generated by the heater.

22 Claims, 4 Drawing Sheets

FOREIGN PATENT DOCUMENTS

| | | |
|---|---|---|
| JP | 05084132 A | 4/1993 |
| JP | 9122010 A | 5/1997 |
| JP | 2003204872 A | 7/2003 |

OTHER PUBLICATIONS

International Search Report for PCT/GB2009/00032 filed Jun. 2, 2009 mailed Oct. 21, 2009.
Written Opinion of the International Searching Authority for PCT/GB2009/00032 filed Jun. 2, 2009 mailed Oct. 21, 2009.

FOOD MIXERS AND PROCESSORS

FIELD OF THE INVENTION

This invention relates to kitchen machines, and it relates in particular to such machines as are commonly referred to as food mixers, and food processors.

BACKGROUND OF THE INVENTION

Food mixers typically comprise stand mixers, by which is meant the kind of kitchen machine in which a receptacle such as a mixing bowl is supported on a pedestal which also supports an electric motor and a drive system including a drive outlet, overhead of the bowl, which permits a planetary mixing action to be imparted to tools suspended into the bowl from the overhead drive outlet.

Food processors, on the other hand, typically comprise machines in which receptacles equipped with rotatable blades or the like can be driven from beneath by means of a motor and drive system housed within a casing upon which the receptacle is supported. Frequently such food processors present two drive outlets (sometimes these are disposed coaxially) which can selectively drive the blades or the like associated with different receptacles, such as a bowl and a goblet, for mixing and blending respectively.

Both types of such kitchen machines are extremely versatile, and recent technical developments provide the possibility of still broader operational capability; such arrangements including heating means provided to permit, in accordance with user selection, ingredients to be heated whilst being subjected to a mixing or processing action. The degree of heating employed may, in accordance with user selection, be sufficient to completely cook, to partially cook, or to merely warm ingredients and it will be understood in this respect that the degree of heating is influenced both by the heater power (wattage) used in any given situation and the time for which the heat is applied.

Such added operational facilities, whilst opening up various more sophisticated possibilities for food preparation, place increased demands upon the sensors and associated controls used to regulate the operation of such machines. In particular, there is a critical need, with kitchen machines equipped with heating capabilities, for accurate measurement of the temperature of the ingredients being mixed or processed and/or of a receptacle containing the ingredients, and it is one object of this invention to provide a kitchen machine incorporating rugged and accurate means for sensing the temperature of a receptacle and/or ingredients therein.

SUMMARY OF THE INVENTION

According to the invention from one aspect there is provided a kitchen machine having a support platform for supporting a receptacle for ingredients to be mixed or otherwise processed therein; an electric motor and a drive system capable of imparting a mixing or other processing action to tool means disposed in the receptacle; and heating means to permit said ingredients in the receptacle to be heated; the receptacle being constructed, at least in a base region thereof, of a first metallic material, such as aluminium, having a relatively high thermal conductivity, disposed between outer and inner skins of a second metallic material of lower thermal conductivity than the first metallic material; the machine further comprising thermal sensing means including a first probe protruding through the receptacle-supporting platform and urged upwardly by resilient means to contact said inner skin and a second probe protruding through the receptacle-supporting platform and urged upwardly by resilient means to contact said first metallic material, and means utilising electrical signals developed by said probes to display and/or control the temperature of said ingredients.

In a preferred embodiment, the second metallic material comprises stainless steel.

Preferably the heating means comprises an induction heater mounted within said machine and at least one of said probes comprises a tubular metallic member, for example of aluminium, sleeved over a part at least of its length with a thermally resistive plastics material substantially unresponsive to the heat developed by said inductive heater. Optionally, an outer surface of said sleeve may be coated with, or incorporate, a non-stick substance, to facilitate repeated movement of the probe with sliding contact relative to an aperture in the receptacle-supporting platform as described in GB2441508 A.

In some preferred embodiments of the invention, at least one of the probes is adapted to resist absorption of heat from the energy field generated by the heater by reducing the diameter of the tubular metal member over a substantial part of its length and providing said sleeve around the part of reduced diameter.

In some such embodiments, the sleeve substantially compensates for the said reduction in diameter; thereby providing a probe which, with the sleeving in place, is of a substantially constant diameter throughout its length. Further preferably, the largest diameter part of the metallic member is at its head, in the region of contact of the probe with the receptacle.

Furthermore, and importantly in some embodiments, the invention may provide the function of a thermal fuse wherein a microprocessor is conditioned to utilise electrical signals provided by the probes to de-energise the heater if a monitored temperature exceeds a predetermined threshold value. The microprocessor may be dedicated to this specific function, or it may be conditioned to perform other functions, such as providing operational control of the heating process and/or producing temperature indications for display.

It is preferred in some embodiments of the invention to provide control means configured such that, once the temperature sensed by a probe exceeds a predetermined level, the electric drive motor is operated relatively slowly, in order to reduce the risk of splashing or otherwise ejecting hot ingredients out of the bowl or causing them to separate.

The control means may include a microprocessor and conveniently the aforementioned microprocessor or an additional such device may be configured to facilitate cooking operations by pre-programming therein a series of pre-determined operational cooking and mixing sequences, any of which can be selected by the user pressing one of a plurality of special function keys, thereby causing the machine to implement the desired operational programme without requiring the user to input all of the individual instructions.

Electrical signals derived from the probes may be utilised to provide a temperature value which may be displayed visually on the kitchen machine or elsewhere and may include textual or graphic indications conveyed to the user by means of a display, such as a liquid crystal display (LCD).

In either event, the electrical signals may be conveyed to the display by hard wiring or they may be transmitted to the display wirelessly, for example by means of radio frequency signalling techniques and/or by means of Bluetooth protocols.

In some preferred embodiments of the invention, the heating means can be automatically controlled by temperature feedback signals derived from the probes to comply with user-input instructions.

In preferred embodiments, the receptacle-supporting surface of the platform is constructed from a specifically chosen grade of plastic material, such as glass-filled PPS, which has been found in practice to provide a good, bearing-like property which accommodates the repeated rotational sliding movement between the base of the bowl and the platform, each time the bowl is fitted to or removed from the platform, typically by means of bayonet fittings.

If necessary, or if preferred, the receptacle-supporting surface of the platform may be coated with or impregnated by a non-stick material such as PTFE, thereby to further facilitate the repeated rotational sliding movements between the base of the bowl and the platform.

Some preferred embodiments of the invention further comprise an interlock configured to prevent energisation of the heating means unless the receptacle is in place on the receptacle-supporting platform and/or an interlock configured to prevent operation of the electric motor unless the receptacle is in place on the receptacle-supporting platform.

In still further embodiments of the invention, the machine may be further provided with a receiver for radio frequency (RF) control signals from a remote control handset (not shown) which permits the kitchen machine to be instructed to perform, or be conditioned to perform, some at least of its functions remotely. In other embodiments, remote control signals for the stand mixer are input by means of a suitable device into the mains wiring and sent to the stand mixer over that wiring.

BRIEF DESCRIPTION OF THE DRAWINGS

In order that the invention may be clearly understood and readily carried into effect, certain embodiments thereof will now be described, by way of example only, with reference to the accompanying drawings, of which.

DETAILED DESCRIPTION OF THE INVENTION

Figure 1:
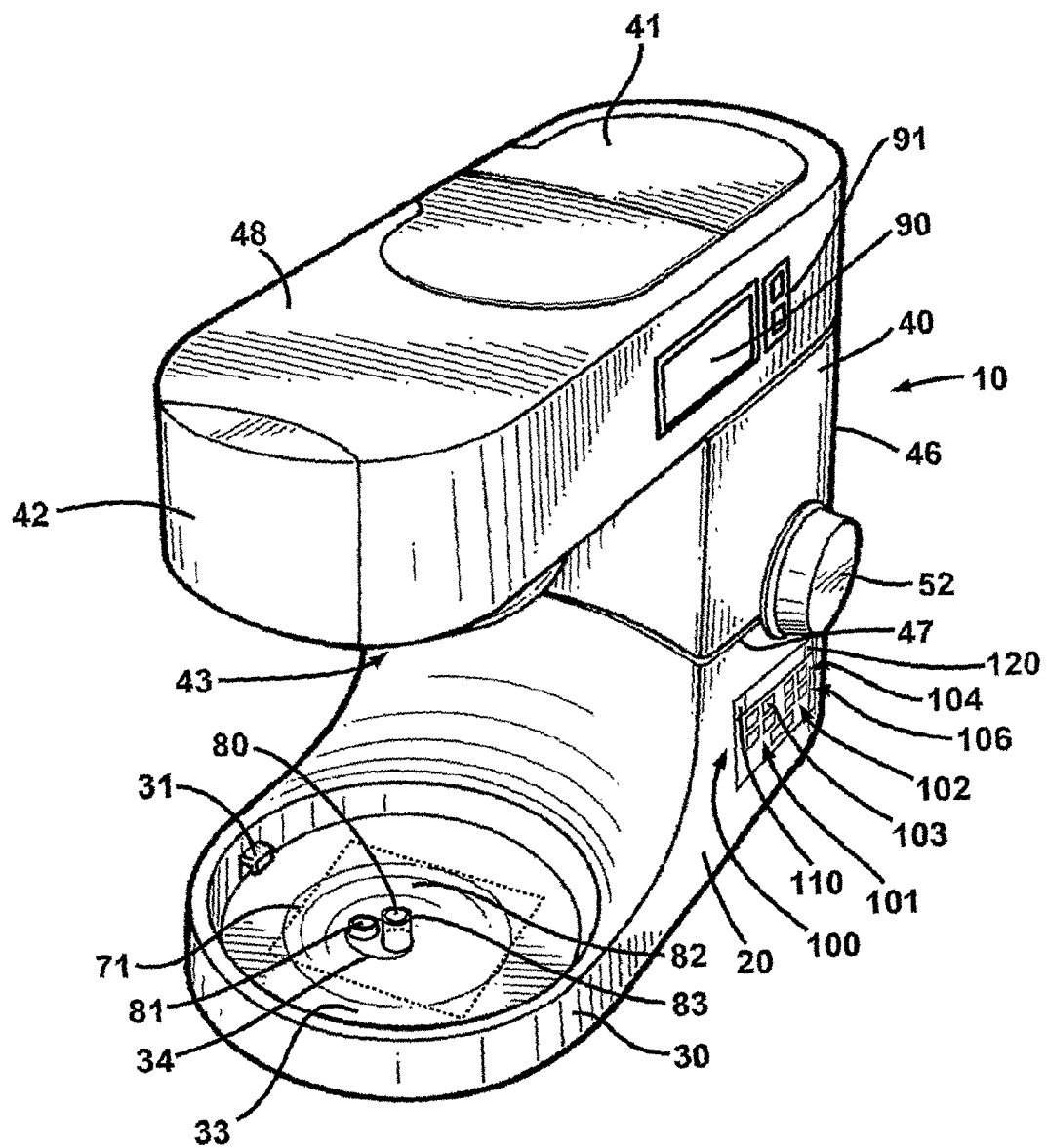
FIG. 1 shows, in perspective view, a kitchen machine in accordance with one example of the invention; the machine comprising in this example a stand mixer.
Figure 2:
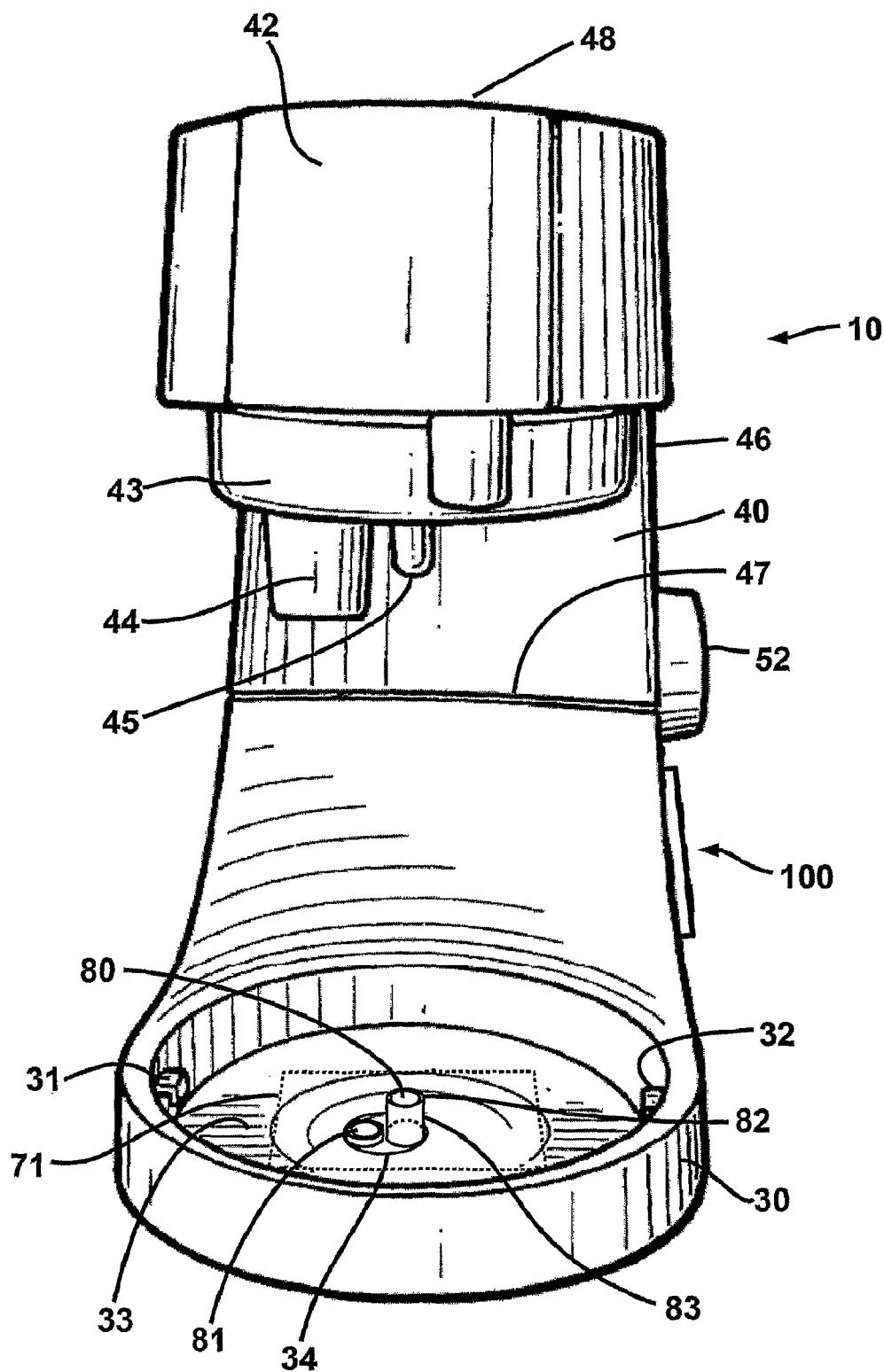
FIG. 2 shows the stand mixer of FIG. 1 from a frontal elevation.
Figure 3:
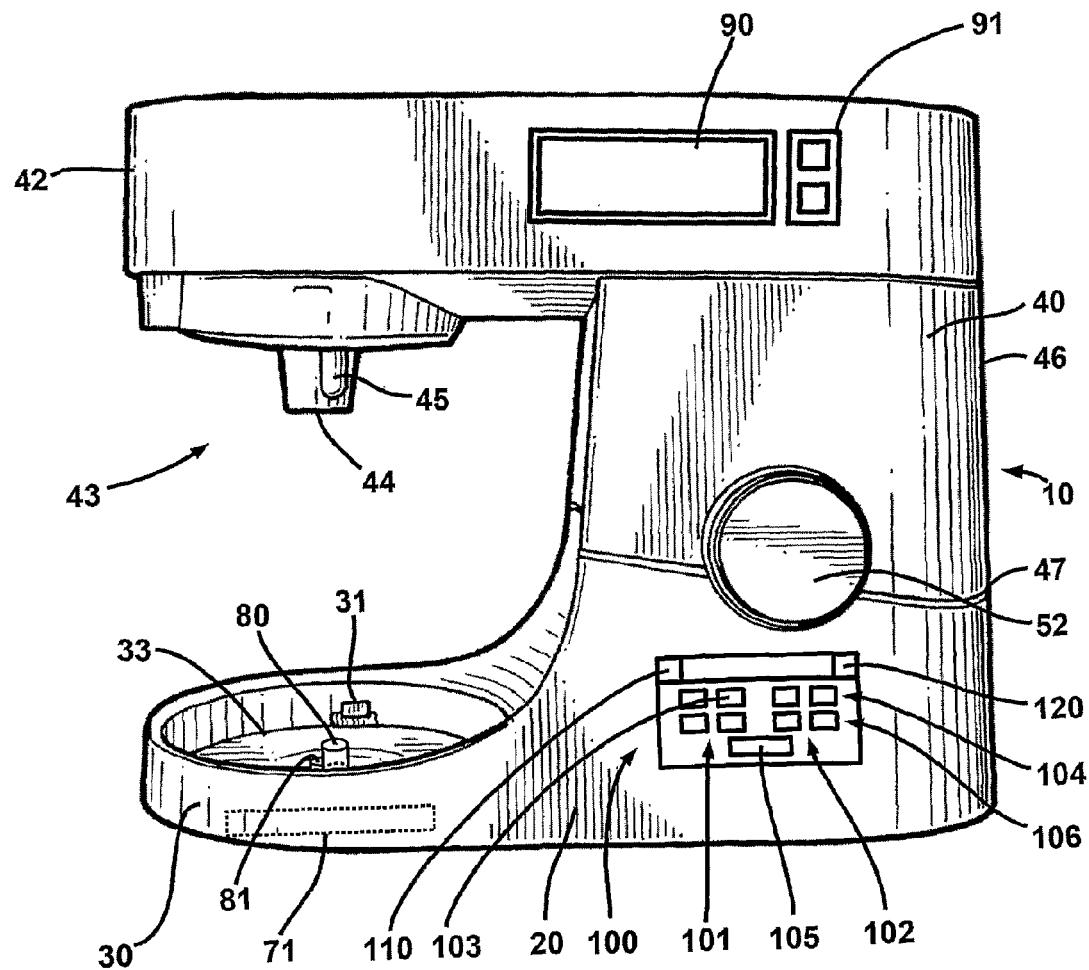
FIG. 3 shows a side elevation of the stand mixer of FIG. 1.

Referring now to FIGS. 1, 2 and 3, in which corresponding features carry the same reference numbers, a stand mixer 10 comprises a pedestal 20 which carries a bowl-supporting platform 30 and a housing 40. The housing 40 encloses, in any convenient fashion, an electric drive motor (not shown) and gearing (not shown) which conveys the motive power supplied by the motor to a plurality of drive outlets to which various tools can be attached to perform a wide variety of tasks in the kitchen.

In this particular example, there is provided a high-speed blender drive outlet behind covers 41; a slow-speed drive outlet, behind cover 42, which may be used, inter alia, to power a mincing attachment; and a planetary drive, overhead of the bowl location, at 43. It will readily be appreciated that more, fewer and/or different drive outlets can be provided in accordance with desired functionality of the stand mixer.

A shanked mixing tool, attached as is conventional, to a socket 44 of the outlet 43, will depend in use into a receptacle, in this case a mixing bowl, placed on the platform 30, and is configured to rotate about both the axis of the socket 44 and the central axis 45 of the outlet 43, thus performing a planetary mixing action. The necessary relationships between the relative shapes and dimensions of the bowl and the mixing tool to ensure thorough and repeatable mixing of ingredients are well known and established in use over many years.

As shown, the stand mixer 10 is, in this example, provided with a pair of latches 31, 32 within a recess 33 provided in the bowl platform 30, which latches co-operate with components on the base of the bowl to form a bayonet latching system which ensures firm and ready location of the bowl on its platform. Other latching systems, such as screw-threading for example, can be used as an alternative to bayonet latching if preferred.

The upright part 46 of the housing 40 is configured with a break line 47, and a suitable mechanism to permit the top part 48 of the stand mixer to be hinged away from the platform 30 end of the pedestal part 20, in order to facilitate the insertion and removal of the mixing tools and the bowl.

Figure 4A:
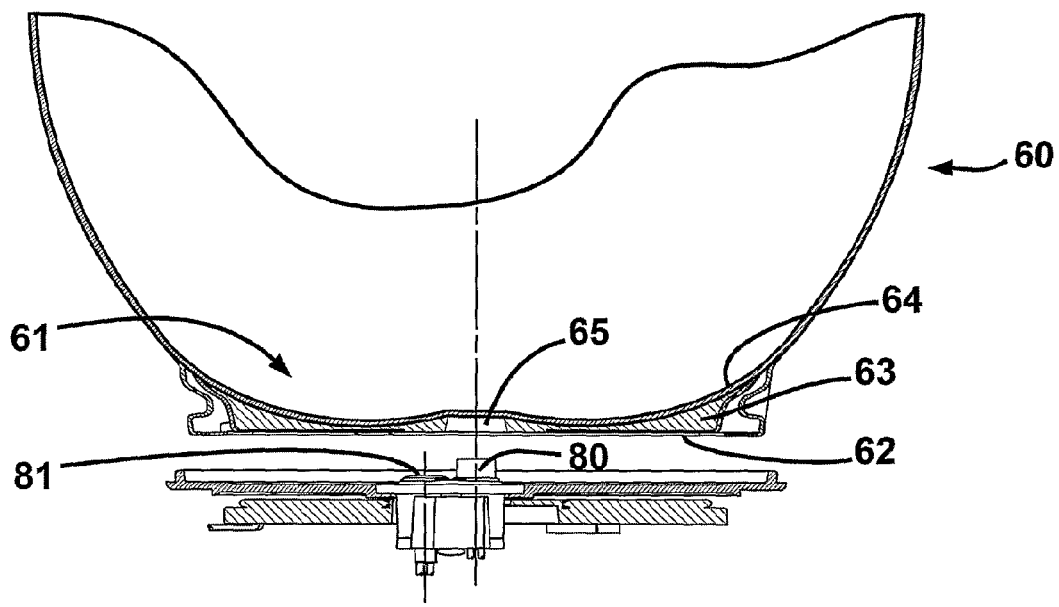
FIGS. 4a and 4b show, in cross-sectional view and in separated and operational relationship respectively, a receptacle and associated temperature probes for use with the stand mixer.
Figure 4B:
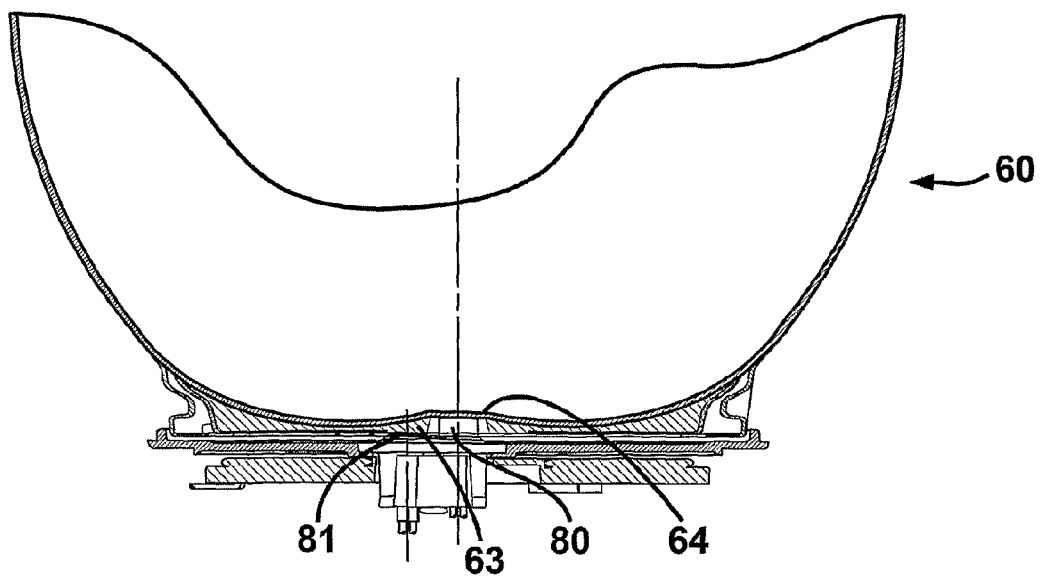

A first example of an arrangement in accordance with the present invention will now be described with additional reference to FIGS. 4a and 4b, which show a bowl 60 configured and dimensioned to be received in the stand mixer 10 with its base 61 located in the recess 33 of the bowl platform 30. The base 61 of the bowl 60 is formed with a diametrically opposed pair of shaped slots (not shown), respectively disposed and configured to co-operate with the latching elements 31, 32 of the stand mixer 10 to perform the aforementioned bayonet latching function.

As shown schematically by dashed outline in FIG. 1, a heater 71 is integrated into the base of the stand mixer 10, beneath the platform 30. The heater 71 is, in this example of the invention, an induction heater of a kind known per se.

The stand mixer 10 also has a thermal sensor for measuring the temperature of the bowl 60, and thus of the contents thereof. The thermal sensor comprises, in this example, a first probe 80 protruding through an aperture 34 in the bowl-supporting platform 30 and urged upwardly by resilient means (not shown) to contact the base 61 of the bowl 60 in use of the arrangement.

It has been shown in practice that, in order to control the foodstuff temperature sufficiently to prevent burning of the foodstuff, and to optimise the heating time, it is necessary to measure not only the temperature of the foodstuff, but also the temperature of the heating surface itself.

The design and position of the temperature sensors has been developed so that their accuracy is not influenced by the heating inductive field, and to also provide reliable and accurate temperature control without compromising the integrity of the bowl.

The heat input to the bowl 60 is induced from the inductive coil 71 which generates heat within an outside skin 62 of stainless steel on the base 61 of the bowl. The heat generated typically is not constant across this stainless steel skin 62, and the formation has been discovered in practice of areas of high localised heat (hot-spots), rendering it difficult to consistently measure the bowl temperature and therefore to control the input heating power sufficiently to prevent burning of the foodstuff.

Accordingly, the bowl 60 is modified by the inclusion of a layer 63 of highly thermally conductive material, in this case aluminium, in its base 61. The aluminium layer 63 evenly distributes the heat across a relatively large area and almost completely eliminates burning under controlled conditions. The inside surface of the bowl 60 comprises a second, inner skin 64 of stainless steel; whereby the base 61 of the bowl 60 comprises the inner skin 64 of stainless steel, the aluminium inter-layer 63 and the outer skin 62. It will be appreciated that the inner skin 64 is the food contacting surface.

The present invention employs two temperature sensors which co-operate with a specially formed base to the bowl. The probe 80 which, in this embodiment of the invention, comprises a negative temperature coefficient (NTC) probe, is located to pass through an aperture 65 in the outer skin 62 and the aluminium interlayer 63, and is urged in use into firm thermal contact with the exposed underside of the inner skin 64 of stainless steel. A second, shorter, probe 81, also (in this example) an NTC probe, offset from the probe 80 but generally parallel to it, is also provided as will be described below.

The two sensors 80 and 81 are, in this example, fitted within plastic sleeves and resiliently urged upwards to ensure good thermal end-on contact with the bowl and to accommodate any dimensional variations due to manufacture. The choice of materials is critical to ensure that the temperature measurements are not adversely affected by the inductive field, and to ensure the mechanical integrity is maintained at high temperatures throughout the life of the product.

As previously mentioned, the probe 80 is in contact with the inner stainless steel skin 64 through the aperture 65 in the aluminium interlayer 63. When the bowl 60 contains foodstuff with high water content, the temperature at the contact area of probe 80 closely represents the temperature of the bowl contents.

Probe 81 is resiliently urged into good thermal contact with an area 66 of the aluminium interlayer 63 which is not covered by the outer skin 62 of stainless steel, and thus measures the temperature of the aluminium inter-layer 63 within the bowl base 61. Since aluminium is a very good conductor of heat, probe 81 senses a temperature that is closely representative of the average foodstuff input temperature. For convenience, in this example, the area 66 comprises part of an annular area 67 which completely surrounds the aperture 65, and from which the outer skin 62 has been omitted or removed.

The support surface, which lies between the bowl and the induction coil 71, is made, in this example of the invention, from a specially chosen grade of plastic, such as glass-filled polyphenylene sulphide ("PPS"). This material has been found to suitably accommodate, and to provide a bearing-like surface for, the repeated rotational sliding movements between the base of the bowl and the platform, each time the bowl is fitted to or removed from the platform by means of the bayonet fittings.

Conventional induction cooking devices use a glass or ceramic plate and crudely measure temperature through this plate. This embodiment of the invention, on the other hand, utilises the plastic plate with temperature sensors that touch the cooking vessel.

Typically, the probes 80 and 81 comprise tubular aluminium members, each of which is respectively sleeved over a part at least of its length with a thermally resistive material, such as a plastics material, substantially unresponsive to the energy field generated by the induction heater 71.

The probes 80 and 81 are adapted to resist absorption of heat from the energy field generated by the heater 71. In this respect, and particularly as regards the longer probe 80, its diameter is reduced over a substantial part of its length and the sleeve of plastics material is provided around the part of reduced diameter.

Conveniently, the radial thickness of the sleeve is such as to compensate for the reduction in diameter of the aluminium probe 80; thereby providing a probe which, with the sleeving in place, is of a substantially constant diameter throughout its length.

The probes 80 and 81 may, of course, be made of materials other than aluminium, provided that such materials (a) provide adequate thermal transfer to a thermal sensor (not shown) such as an NTC sensor, typically mounted within a hollowed internal region of the probe or otherwise associated therewith, to permit reliable temperature measurements to be made, and (b) can tolerate the mechanical and thermal environments in which they have to work in this context.

As is known, the supply of power to the inductive heater 71 may be interrupted briefly each time temperature measurements are taken from the probes 80 and 81.

Temperature readings derived from electrical signals provided by the thermal sensors associated with the probes 80 and 81 are processed to provide useful parameters indicative of the temperature of the bowl 60 and/or its contents. These parameters are, in this example, used to automatically control the heating or cooking process. Alternatively, or in addition, the parameters, or features derived therefrom, may be displayed visually on the stand mixer 10 and/or elsewhere and may include textual or graphic indications conveyed to the user by means of a display, such as a liquid crystal display (LCD) 90 which, in this case, is carried by the stand mixer 10.

Whether the display is carried by the stand mixer 10 or located elsewhere, the temperature readings may be conveyed thereto either by hard wiring or wirelessly, for example by means of radio frequency signalling techniques and/or by means of Bluetooth protocols.

In some embodiments of the invention, the operation of the heater 71 can be automatically controlled by temperature feedback signals derived by processing the electrical signals provided by the probes 80 and 81 to comply with user-input instructions for certain operational cooking programmes.

A thermal fuse (not shown) may also be provided in the stand mixer 10. In a preferred embodiment, however, the function of a thermal fuse is performed by microprocessor conditioned to utilise electrical signals provided by the probes to de-energise the heater if the monitored temperature exceeds a predetermined threshold value. The microprocessor may be dedicated to this specific function, or it may be conditioned to perform other functions, such as providing operational control of the heating process and/or producing temperature indications for display.

It is preferred that an interlock is provided to prevent the energisation of the heater 71 unless the bowl 60 is in place. Indeed, an interlock may also prevent operation of the electrical drive motor of the stand mixer 10 unless the bowl is in place.

Referring again to FIGS. 1, 2 and 3, it will be noted that the stand mixer is provided with a switch pad 100 presenting user-operable power controls 101 and timer controls 102. The controls 101 and 102 comprise, in this example, digital controls interacting with a microprocessor (not shown) housed at any convenient location within the stand mixer housing. Alternatively, the controls 101 and 102 may be analogue controls or one of them may use digital technology and the other analogue, depending upon design, cost and other criteria.

In this example, the power controls 101 provide control switches such as 103 to provide user-selected instructions to the microprocessor as to the heating power required and digital timing controls 102 provide control switches 104 for controlling timed operation of the motor-driven planetary drive of the stand mixer and control switches 106 for controlling timed operation of the heating element. The electrical signals provided by the probes 80 and 81 are also processed by the microprocessor to provide the required display and/or automatic control of the kitchen machine.

The various switches are used to convey user instructions to the microprocessor and it will be appreciated that the microprocessor may be configured to provide internal electronic interlocks to prevent certain combinations of instructions from being implemented. If an operation is prohibited, the user is warned that an inoperable or inadvisable combination of instructions has been inputted and that the user's operational strategy needs to be revised. In some embodiments of the invention, the warnings may be supplemented with, or replaced by, a visual display, such as a part of the liquid crystal display (LCD) 90 used to convey textual and/or graphic instructions to the user. Associated with the display 90 are typical resetting and function control buttons 91.

When the planetary mixing action is to be used, continuously or intermittently, during a cooking process, some embodiments of the invention provide an automatic facility whereby, once the temperature of the ingredients in the bowl 60 has exceeded a predetermined threshold temperature, as indicated by the electrical signals provided by the probes 80 and 81, the electric drive motor is caused to operate with reduced speed, in order to reduce the risk of splashing or otherwise ejecting hot ingredients out of the bowl.

In some embodiments, the stand mixer is provided with a receiver, for example in the form of an antenna formed on or coupled to a window 120 in the casing 20, for radio frequency (RF) control signals from a remote control handset (not shown) which permits the stand mixer to be instructed to perform, or be conditioned to perform, some at least of its functions remotely. In other embodiments, remote control signals for the stand mixer are input by means of a suitable device into the mains wiring and sent to the stand mixer over that wiring.

In some embodiments of the invention, the bowl-supporting surface of the platform 30 may be coated with (or impregnated by) a non-stick material such as PTFE, thereby to further facilitate the repeated rotational sliding movement between the base 61 of the bowl 60 and the platform 30, each time the bowl 60 is bayonet-fitted to, or removed from, the platform.

The invention claimed is:

1. A kitchen machine having a support platform for supporting a receptacle for ingredients to be mixed or otherwise processed therein; an electric motor and a drive system capable of imparting a mixing or otherwise processing action to tool means disposed in the receptacle; and heating means to permit said ingredients in the receptacle to be heated; the receptacle being constructed, at least in a base region thereof, of a first metallic material having a relatively high thermal conductivity, disposed between outer and inner skins of a second metallic material of lower thermal conductivity than the first metallic material;

the machine further comprising thermal sensing means including a first probe protruding through the receptacle-supporting platform and urged upwardly by resilient means to contact said inner skin and a second probe protruding through the receptacle-supporting platform and urged upwardly by resilient means to contact said first metallic material, and means utilizing electrical signals provided by said probes to display and/or control the temperature of said ingredients.

2. The machine according to claim 1, wherein the second metallic material comprises stainless steel.

3. The machine according to claim 1, wherein the heating means comprises an induction heater and the first and second probes are adapted to resist absorption of heat from an energy field generated by the induction heater.

4. The machine according to claim 1, wherein at least one of said probes comprises a tubular metal member.

5. The machine according to claim 4, wherein said at least one probe is formed with a head portion adapted to contact, in use, the base of said receptacle and wherein diameter of the tubular metal member over at least a part of its length is less than that of the head portion.

6. The machine according to claim 5, wherein the tubular member of said at least one probe is surrounded by a sleeve of plastics material, and wherein radial thickness of said sleeve substantially compensates for a reduction in diameter of said tubular member; thereby providing a probe which, with the sleeve in place, is of a substantially constant diameter throughout its length.

7. The machine according to claim 1, wherein at least one of said probes is made of aluminum.

8. The machine according to claim 1, wherein function of a thermal fuse is provided by means including a microprocessor conditioned to utilize said electrical signals provided by the probes to de-energize the heating means if monitored temperature exceeds a predetermined threshold value.

9. The machine according to claim 1, further comprising control means adapted to respond to a temperature monitored by said probes exceeding a predetermined threshold temperature by causing the electric motor to operate at a reduced speed during operation.

10. The machine according to claim 9, wherein said control means includes a microprocessor.

11. The machine according to claim 1, further comprising display means for displaying temperature readings derived from electrical signals provided by the probes.

12. The machine according to claim 11, wherein said display means comprises a display carried by the kitchen machine.

13. The machine according to claim 11, wherein temperature readings are conveyed to the display means by hard wiring.

14. The machine according to claim 11, wherein temperature readings are conveyed to the display means wirelessly.

15. The machine according to claim 1, further comprising control means for automatically controlling operation of said heating means in response to electrical signals derived from said probes.

16. The machine according to claim 1, wherein said receptacle-supporting platform is formed of glass-filled polyphenylene sulphide (PPS).

17. The machine according to claim 1, wherein a surface of the receptacle-supporting platform is coated with or impregnated by a non-stick material.

18. The machine according to claim 17, wherein said non-stick material is polytetrafluoroethylene (PTFE).

19. The machine according to claim 1, further comprising an interlock configured to prevent energization of the heating means unless the receptacle is in place on the receptacle-supporting platform.

20. The machine according to claim 1, further comprising an interlock configured to prevent operation of the electric motor unless the receptacle is in place on the receptacle-supporting platform.

21. The machine according to claim 1, wherein the first metallic material comprises aluminum.

22. The machine according to claim 1, wherein thermal conductivity of said first metallic material is sufficiently high to permit a temperature sensed by said second probe to represent average input temperature applied to said ingredients.

\* \* \* \* \*